United States Patent [19]
Norton

[11] Patent Number: 4,520,438
[45] Date of Patent: May 28, 1985

[54] AMPLIFIER POWER STAGE

[76] Inventor: Peter Norton, 170 Beaver Brook, Lincoln Park, N.J. 07035

[21] Appl. No.: 516,574

[22] Filed: Jul. 25, 1983

[51] Int. Cl.³ .............................................. H02P 13/20
[52] U.S. Cl. ..................................... 363/98; 363/132; 323/289; 307/270
[58] Field of Search .......................... 363/98, 131–134; 307/270, 300; 323/289

[56] References Cited

U.S. PATENT DOCUMENTS

| 3,976,932 | 8/1976 | Collins | 363/132 |
| 4,020,361 | 4/1977 | Suelzle et al. | 363/132 X |
| 4,204,266 | 5/1980 | Kammiller et al. | 363/98 |
| 4,224,535 | 9/1980 | Wilson et al. | 323/289 X |

FOREIGN PATENT DOCUMENTS 0076022  4/1983  European Pat. Off. ............. 323/289

Primary Examiner—Peter S. Wong
Attorney, Agent, or Firm—Reising, Ethington, Barnard, Perry & Milton

[57] ABSTRACT

A switching amplifier in a bridge circuit configuration is provided with an improved base drive circuit which is highly efficient. The base drive circuit includes a base current shunting transistor across the base-to-emitter circuit of each high current transistor. The first and second high current transistors have their base-to-emitter circuits connected across the supply voltage terminals of the bridge in series with first and second inductors and in series with a first base current regulating transistor. The current in the first and second inductors increases while the first base current regulating transistor is turned on. The first and second diodes provide respective current paths for current through the first and second inductors and the base-to-emitter circuits of the first and second high current transistors when the first base current regulating transistor is turned off. The base drive circuits for the third and fourth high current transistors are the same as that as those described for the first and second high current transistors. A control circuit is disclosed for the base current regulating transistor to maintain the base drive current at a predetermined value. A load current sensing circuit is disclosed to obtain an accurate indication of the output current of the amplifier.

13 Claims, 5 Drawing Figures

AMPLIFIER POWER STAGE

FIELD OF THE INVENTION

This invention relates to switching amplifiers and more particularly, it relates to an improved switching amplifier in which high current transistors are connected in a bridge circuit configuration.

BACKGROUND OF THE INVENTION

Switching amplifiers are commonly used for controlling the energization of load devices such as a reversible DC motor. In a known arrangement, four high current switching transistors are connected in a bridge circuit with a power supply connected across one pair of diagonally opposite terminals and the load device connected across the other pair of diagnonally opposite terminals. When a first pair of diagonally opposite transistors is switched on and the second diagonally opposite pair is switched off, voltage is applied to the load device in one direction and vice versa. The degree of energization of the load device is controlled by rapidly switching the transistors on and off according to a controlled program.

In many applications of switching amplifiers with high current transistors in a bridge circuit, a large base drive current is required. An example of such a requirement is found in automotive applications such as controlling the energization of an electric power steering servo motor. In such applications, it is important to minimize the waste of energy and accordingly a highly efficient switching amplifier is desired. Improved efficiency can be obtained by minimizing the power losses in the base drive circuit itself and also by providing a base drive current which is varied directly with the output current of the high current transistors.

Heretofore, switching amplifiers have been used in which the base of the high current transistor is connected to the junction of a voltage divider comprising a resistor and a switching transistor connected across the voltage source. The load device is serially connected with the collector-to-emitter circuit of the high current transistor across the voltage source. The base drive current for the high current transistor is applied through the resistor when the switching transistor is turned off and hence the load device is energized. When the switching transistor is turned on it shunts the base-to-emitter circuit of the high current transistor which is turned off and the load device is deenergized. A disadvantage with this base drive circuit is that the resistor is continuously drawing current and a significant amount of power is wasted. Another disadvantage is that the base drive current varies with power supply voltage.

A switching amplifier having a base drive circuit of improved efficiency, relative to that described above, is disclosed in U.S. Pat. No. 4,224,535. The switching amplifier of this patent comprises a high current transistor and a load device connected across the voltage source with the load device in the collector circuit. Base drive current is provided by a circuit including a base current regulating transistor, an inductor and a base current shunting transistor in series across the voltage source with the base of the high current transistor being connected to the junction of the inductor and the base current shunting transistor. A diode is connected across the inductor and the base current shunting transistor to provide a current path for the inductor current when the base current regulating transistor is turned off. In this circuit, base drive current for the high current transistor is supplied through the inductor when the base current shunting transistor is turned off; when the base current shunting transistor is turned on, it diverts the base drive current and the high current transistor is turned off. The inductor is of low resistance and the power loss therein is minimized. The inductor stores energy when the base current regulating transistor is turned on and it releases energy to maintain current flow for base drive when the base current rgulating transistor is turned off.

A general object of this invention is to provide a bridge circuit switching amplifier with a base drive circuit which overcomes certain disadvantages of the prior art.

SUMMARY OF THE INVENTION

In accordance with this invention, a bridge circuit switching amplifier is provided with an improved base drive circuit which is highly efficient. This is accomplished by providing a base current shunting transistor across the base-to-emitter circuit of each high current transistor. The first and second high current transistors have their base-to-emitter circuits connected across the supply voltage terminals of the bridge circuit in series with first and second inductors and in series with a first base current regulating transistor whereby the current in the first and second inductors increases while the first base current regulating transistor is turned on. First and second unidirectional conducting means provide respective current paths for current through the first and second inductors and the base-to-emitter circuits of the first and second high current transistors when the first base current regulating transistor is turned off. The third and fourth high current transistors have their base-to-emitter circuits connected across the supply voltage terminals of the bridge circuit in series with third and fourth inductors and in series with a second base current regulating transistor whereby the current in the third and fourth inductors increases while the second base current regulating transistor is turned on. Third and fourth unidirectional conducting means provide respective current paths for current through the third and fourth inductors and the base-to-emitter circuits of the third and fourth high current transistors when the second base current regulating transistor is turned off. Preferably, each base current regulating transistor comprises a field effect transistor and each unidirectional conducting means comprises a diode.

Further, in accordance with this invention, an improved base drive circuit is provided for increased efficiency of operation and lower control signal requirement. This is accomplished by providing an additional base current shunting transistor and inductor in cascade relation with that described above, the additional shunting transistor and inductor being of lower current capacity whereby a smaller control signal current is required.

Further, in accordance with this invention, a bridge circuit switching amplifier is provided with a base drive circuit for each high current transistor which provides base drive current that is substantially independent of power supply voltage fluctuations. This is accomplished by providing a control circuit for the base current regulating transistor to maintain the drive current at a predetermined value. The control circuit comprises a clock for initiating each conduction cycle of the base current regulating transistor. The conduction cycle has a duration which is inversely proportional to the power supply voltage. Preferably, the duration of the conduction cycle is equal to the time required to charge a capacitor to a predetermined reference voltage using a charging current proportional to the power supply voltage whereby the base drive current has a value determined by the reference voltage. Further, means may be provided to increase the reference signal with increased output current of the amplifier so that the base drive current increases as in accordance with another variable such as an increase in the output of the amplifier.

Further, in accordance with this invention, a bridge circuit switching amplifier is provided with a low cost means for accurately sensing load current. This is accomplished by a pair of current sensing resistors connected in the bridge circuit so that an accurate indication of the output current of the amplifier may be derived from the voltage across each sensing resistor.

A more complete understanding of this invention may be obtained from the detailed description that follows taken with the accompanying drawings.

DESCRIPTION OF THE DRAWINGS

FIG. 1A shows a modification of a circuit element for the circuit of FIG. 1;

BEST MODE FOR CARRYING OUT THE INVENTION

Figure 1:
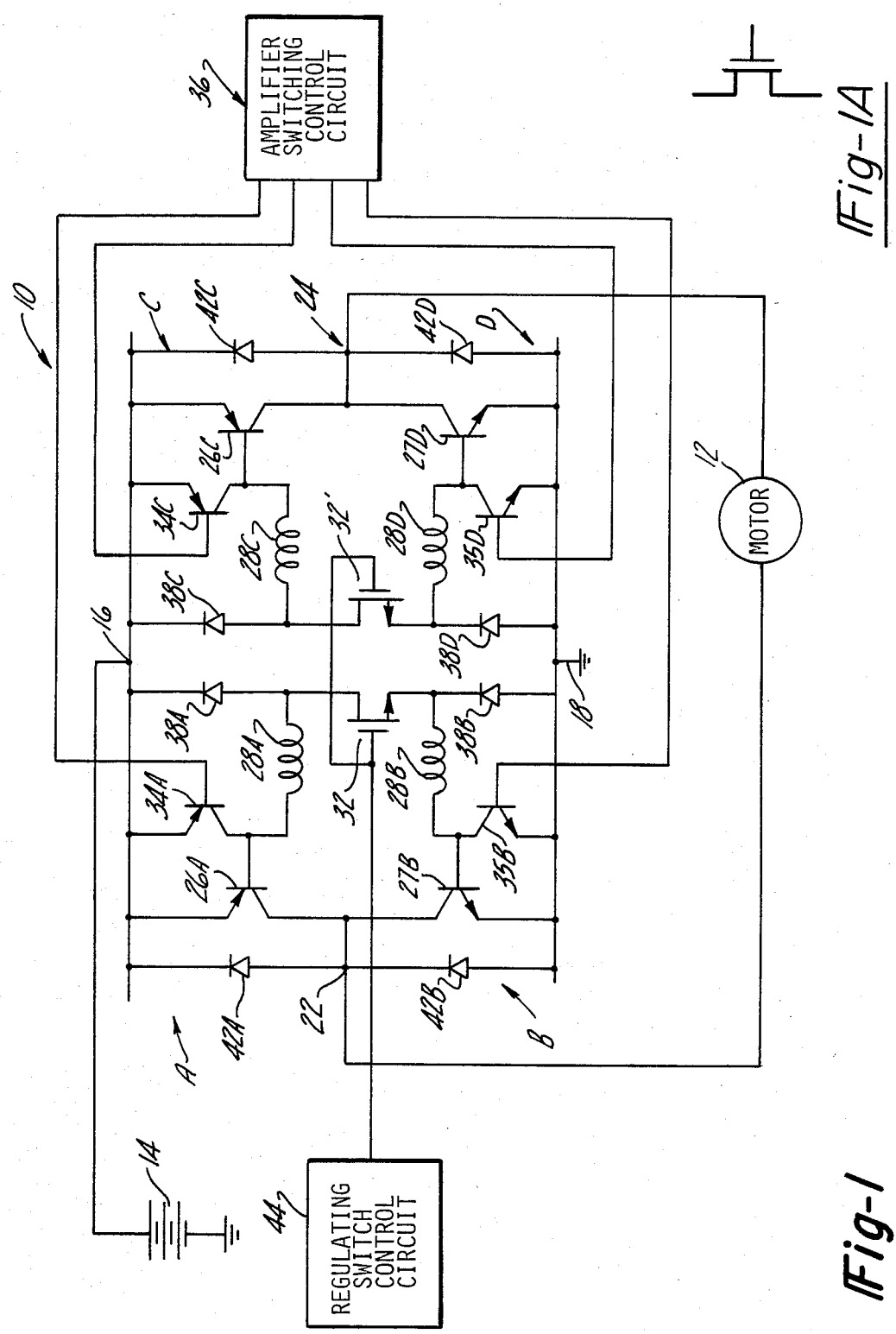
FIG. 1 is a schematic diagram of one embodiment of the bridge circuit switching amplifier of this invention.

Referring now to the drawings, there is shown an illustrative embodiment of the invention in a bridge circuit switching amplifier for reversibly energizing a load device such as a reversible motor from a DC voltage source. It will be appreciated, as the description proceeds, that the invention is useful in other application and may be implemented in circuitry different from the illustrative embodiment.

The switching amplifier 10 of this invention is shown in FIG. 1 in which it is adapted to control the energization of a reversible DC motor 12 from a DC voltage source 14. The switching amplifier 10 is a bridge circuit having a pair of diagonally opposite power input terminals 16 and 18 and a pair of diagonally opposite output terminals 22 and 24. The power input terminals 16 and 18 are connected respectively with the positive terminal at the voltage source 14 and ground. The power output terminals 22 and 24 are connected to opposite terminals of the motor 12.

A bridge circuit comprises bridge arms A and B which are adjacent each other and disposed in a serial relationship between the power input terminals 16 and 18. It also comprises bridge arms C and D which are adjacent each other and disposed in a serial relationship between the power input terminals 16 and 18. Bridge arms A and C are made up of identical components and are, in effect, mirror images of each other. The same is true of bridge arms B and D. Accordingly, for the sake of brevity, only bridge arms A and B will be described in detail, it being understood that the same description will apply to bridge arms C and D. In this description, like components will be designated with the same reference numerals followed by the letter A, B, C or D in accordance with the bridge arm with which it is associated.

Bridge arm A comprises a high current transistor 26A of the PNP type with its emitter connected to the positive power input terminal 16 and its collector connected with the output terminal 22. The base of the high current transistor 26A is connected through an inductor 28A to the drain electrode of a field effect transistor 32 which functions as a regulating switch in a manner to be described subsequently. For the purpose of controlling the high current transistor 26A, a PNP shunt switching transistor 34A is connected in shunt relation with the base-to-emitter circuit of the high current transistor 26A. In particular, the collector-to-emitter circuit of shunt switching transistor 34A is connected across the base-to-emitter circuit of the high current transistor 26A and the base of shunt switching transistor 34A is connected to switching control circuit 36 which will be described subsequently. A diode 38A, herein termed a recirculating diode, is connected in series with the base-to-emitter circuit of the high current transistor 26A and the inductor 28A to conduct circulating current generated by the inductor 28A when the FET 32 is turned off. A clamping diode 42A is connected across the collector-to-emitter circuit of the high current transistor 26A to limit the voltage swing across these electrodes of the high current transistor.

Bridge arm B comprises a high current transistor 27B which corresponds with high current transistor 26A except that is is an NPN transistor rather than a PNP transistor. The high current transistor 27B has its collector connected with the output terminal 22 and its emitter connected with ground terminal 18. The base of the high current transistor 27B is connected through an inductor 28B to the source electrode of the FET 32. An NPN shunt switching transistor 35B is connected in shunt relation with the base-to-emitter circuit of the high current transistor 27B. More particularly, the collector-to-emitter circuit of the shunt switching transistor 35B is connected across the base-to-emitter circuit of the high current transistor 27B and the base of shunt switching transistor 35B is connected to switching control circuit 36. A recirculating diode 38B is connected in series with the inductor 28B and the base-to-emitter circuit of the high current transistor 27B. A clamping diode 42B is connected across the collector-to-emitter circuit of the high current transistor 27B.

The regulating FET 32 has its control electrode connected with a regulating switch control circuit 44 which supplies the control voltage to the FET 32 to switch it on or off for the purpose of maintaining a desired level of base drive current available for either high current transistor 26A or high current transistor 27B, as will be described subsequently. As noted above, bridge arm C is a mirror image of bridge arm A and it functions in a similar manner; also, bridge arm D is a mirror image of bridge arm B and functions in a similar manner. It is further noted that a FET 32' is connected with bridge arms C and D in the same manner as FET 32 is connected with bridge arms A and B. FET 32' has its control electrode connected with the regulating switch control circuit 44, the same as FET 32.

The operation of the circuit of FIG. 1 will now be described. The high current transistors 26A, 27B, 26C and 27D function as current switches which are controlled by the amplifier switching control circuit 36. The switching amplifier 10 may be switched by the control circuit 36 to several different states. In one state, high current transistors 26A and 27D are turned on, i.e. conductive and high current transistors 26C and 27B are turned off, i.e. nonconductive. In this state, the voltage at output terminal 22 is approximately equal to the positive voltage of the voltage source 14 and the output terminal 24 is approximately at ground potential. This first state of the switching amplifier 10 is operative to apply voltage to motor 12 in one direction. In a second state, high current transistors 26C and 27B are turned on and transistors 26A and 27D are turned off. This causes output terminal 24 to be at a voltage approximately equal to the positive terminal of the voltage source 14 and the output terminal 22 is held at approximately ground potential. In this second state, voltage is applied to motor 12 in a reverse direction relative to the first state. A third state of the switching amplifier 10 may be provided in which transistors 27B and 27D are turned on and transistors 26A and 26C are turned off. In this third state, both output terminals 22 and 24 are held at approximately ground potential and no voltage is applied to motor 12. Alternatively, a fourth state may be provided in which transistors 26A and 26C are turned on and transistors 27B and 27D are turned off. In this fourth state, both output terminals 22 and 24 are held at approximately the voltage of the positive terminal of the voltage source 14 and the voltage applied to motor 12 is therefore approximately zero.

The base drive current for the high current transistors 26A, 27B, 26C and 27D is controlled by the respective shunt switching transistors 34A, 35B, 34C and 35D. Referring to high current transistor 26A and its shunt switching transistor 34A, base drive current is supplied to the emitter base junction of the transistor 26A when the shunt switching transistor 34A is turned off. The base-to-emitter circuit of high current transistor 26A is short circuited by shunt switching transistor 34A when it is turned on and hence there is no base drive current to transistor 26A. The on or off condition of the shunt switching transistor 34A, as mentioned above is controlled by the amplifier switching control circuit 36. It is apparent that the control of the base drive current is accomplished in the same manner for turning on or off the high current transistors 27B, 26C and 27D.

Base drive current is provided to each of the high current transistors 26A, 27B, 26C and 27D through the respective inductors 28A, 28B 28C and 28D in two different modes of operation. The first mode of operation occurs for high current transistors 26A and 27B when the FET 32 is turned on and the second mode occurs when it is turned off. Likewise, the first mode of operation occurs for high current transistors 26C and 27D when the FET 32' is turned on and the second mode occurs when it is turned off. Referring now to high current transistors 26A and 27B, the first mode of operation for supplying base drive current will be described. In this first mode with FET 32 turned on, base drive current will flow from the positive power supply terminal 16 through the base-to-emitter junction of high current transistor 26A (assuming shunt switching transistor 34A is off) and thence through inductor 28A, the FET 32, inductor 28B and thence through shunt switching transistor 35B to the power supply ground terminal 18. (Shunt switching transistor 35B must be on when shunt switching transistor 34A is off to thereby avoid a direct short circuit of the power supply by the high current transistors 26A and 26B). In the second mode of operation for supplying base drive current, FET 32 is tunred off and the current path just described for the first mode is interrupted. However, stored energy in the magnetic field of inductor 28A causes continuing current flow through the inductor 28A, recirculating diode 38A and the base emitter junction of high current transistor 26A, assuming that shunt switching transistor 34A is turned off. If it is not, base drive current will flow through it rather than the base emitter junction of high current transistor 26A. Similarly, in the second mode of operation for providing base drive current, the stored energy in the magnetic field of inductor 28B causes continuing current flow through the inductor 28B, the recirculating diode 38B and the shunt switching transistor 35B, assuming that it is turned on. If it is not, the base drive current will flow through the base emitter junction of the high current transistor 27B. It will now be apparent that base drive current is provided for high current transistors 26C and 27D in the same manner as just described for high current transistors 26A and 27B.

The circuit for providing base drive current as described above affords great advantage in the operation of the switching amplifier. In particular, the base drive current is subject to much smaller variations resulting from changing operating conditions than in the prior art. This will be discussed with reference to a known form of regulating switch control circuit 44, namely a pulse generating circuit having a constant duty cycle. The higher the duty cycle, the greater the effective value of base drive current for a given operating condition of the switching amplifier. In the prior art switching amplifiers a single high current transistor is associated with a base drive circuit including an inductor, recirculating diode and shunt switching transistor. With a regulating signal of constant duty cycle the base drive current varies inversely with the effective impedance of the base drive circuit averaged over a time approximating the decay time of the current in the inductor. When the shunt switching transistor is turned off, the base drive circuit includes the base emitter junction of the high current transistor and the effective impedance of the circuit is greater than when the shunt switching transistor is turned on so that the base drive current flows through the shunt switching transistor. Thus, there is a variation of the effective impedance when the shunt switching transistor is switched from one state to the other. Further, when the output current of the high current transistor is large a larger base drive voltage is required, i.e. the effective impedance is increased still further. In the prior art, these effects combine to cause very large base drive current variations when the regulating signal has a constant duty cycle. On the other hand, the base drive circuit of this invention minimizes the variations in the base drive current when the regulating signal has a constant duty cycle. This obtains as follows. When the regulating signal has a constant duty cycle, the base drive current is determined by the total average impedance of the two base drive circuits in series, i.e. the effective impedance of the base drive circuit for high current transistor 26A added to the effective impedance of the base drive circuit for the high current transistor 27B. This follows from the fact that the currents through inductors 28A and 28B will stabilize at the same value when FET 32 is conducting. Since it is approximately true that high current transistor 26A is off when transistor 27B is on and vice versa the total on time, i.e. the total time that either transistor is on, is constant. So the fraction of the time that either transistor conducts cannot affect the effective impedance. This leaves only the variation of impedance of the base emitter junction of the high current transistor to cause variation in the base drive current. However, in the circuit of FIG. 1, the base drive circuits for high current transistors 26A and 27B are combined in cascade through the FET 32 so that there are twice as many components in series, as compared to a separate base drive circuit for each high current transistor, so that the total impedance is about twice as great. Further, since only one of the high current transistors can be conducting at any time, the impedance at the base emitter junction can only enter once in the total impedance. Consequently, the effect of impedance variation of the base emitter junction of the high current transistors is reduced by a factor of about two. Accordingly, due to the improved base drive circuit in the switching amplifier of FIG. 1, the regulating signal of constant duty cycle is usable in certain applications with the advantage of low cost and simplicity. Other regulating switch control circuits will be described subsequently.

Figure 2:
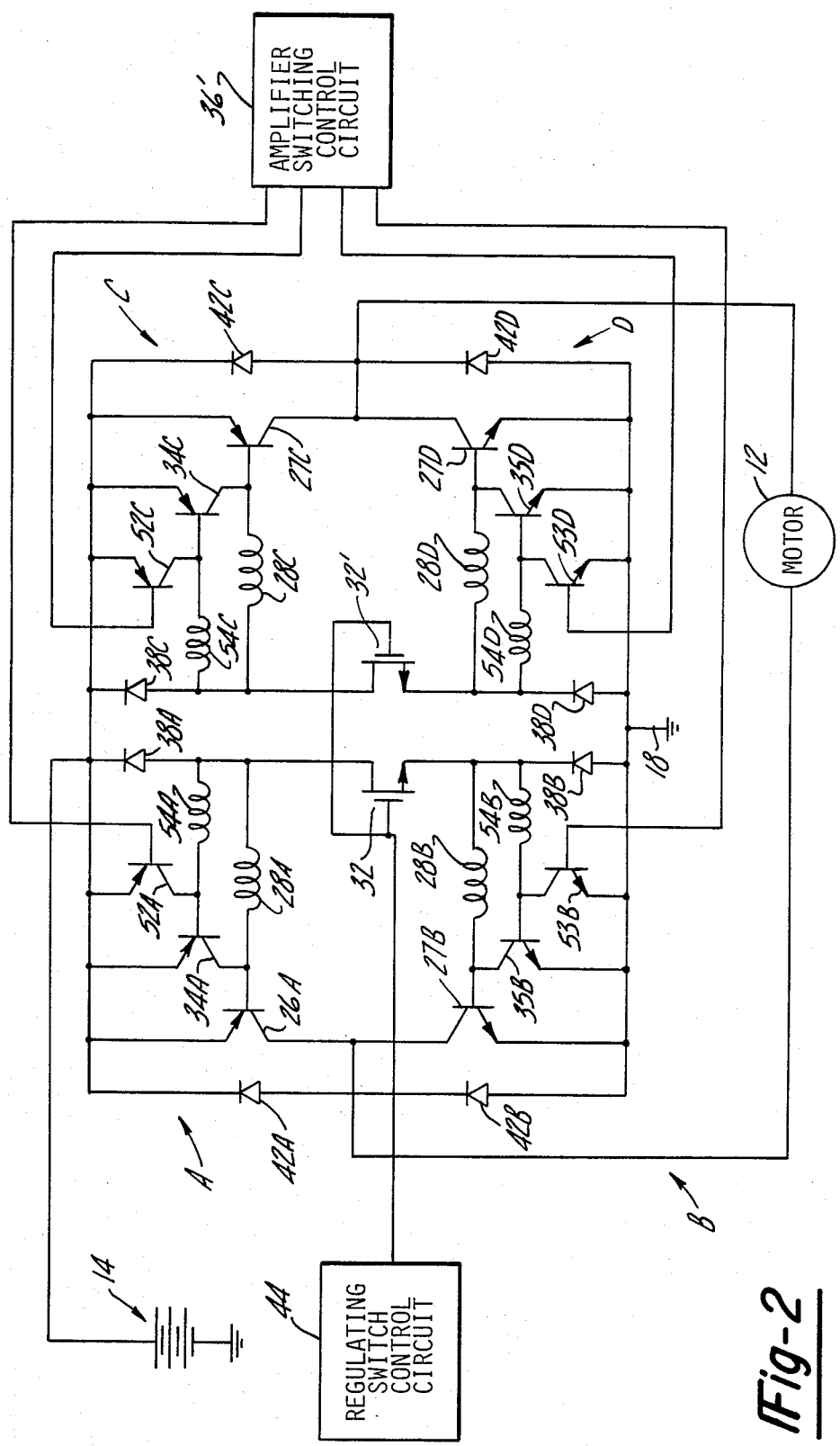
FIG. 2 is another embodiment of the bridge circuit switching amplifier of this invention.

Another embodiment of the invention is shown in FIG. 2. This embodiment is the same as that of FIG. 1 except that an additional stage of amplification has been provided in the base drive circuits, as will be described. This enables the circuit to be driven with lower level control signals which are the same as in the embodiment of FIG. 1 except that they are inverted and supplied by an amplifier switching control circuit 36'. The additional circuitry in the embodiment of FIG. 2 (which is the only difference from the embodiment of FIG. 1) is as follows. In bridge arm A, a shunt shunt switching transistor 52A of the PNP type has its collector-to-emitter circuit connected across the base-to-emitter circuit of shunt switching transistor 34A. The base of shunt switching transistor 52A is connected to the amplifier switching control circuit 36' and inductor 54A is connected between the base of shunt switching transistor 34A and the anode of the recirculating diode 38A. The shunt switching transistor 52A and the inductor 54A are suitably of smaller current capacity than the shunt switching transistor 34A and inductor 28A. In bridge arm B, a shunt switching transistor 53B of the NPN type has its collector-to-emitter circuit connected across the base-to-emitter circuit of shunt switching transistor 35B. The base of the shunt switching transistor 53B is connected to the amplifier switching control circuit 36' and an inductor 54B is connected between the base of shunt switching transistor 35B and the cathode of the recirculating diode 38B. The bridge arm C includes a switching transistor 52C and an inductor 54C. This circuit is a mirror image of the circuit of bridge arm A. Bridge arm D includes a shunt switching transistor 53D and an inductor 54D and this circuit is a mirror image of the circuit in bridge arm B.

The operation of the embodiment of FIG. 2 is similar to that of FIG. 1. With reference to bridge arm A, for example, high current transistor 26A is turned on when shunt switching transistor 34A is turned off as described previously which will happen when shunt switching transistor 52A is turned on and shunts current past the base-to-emitter circuit of shunt switching transistor 34A. High current transistor 26A is turned off when switching transistor 34A is turned on as described previously which will happen when shunt switching transistor 52A is turned off and base drive current enters the base of transistor 34A. It will be understood that the base drive circuits of the bridge arms B, C and D operate in an analogous manner. The embodiment of FIG. 2 is advantageous in that it is driven by control signals of low level from the amplifier switching control circuit 36'.

The magnitude of the base drive current for the high current transistor must be great enough to operate these transistors in saturation. The value of the base drive current is determined by the operation of the regulating switch control circuit 44 and the regulating switches, i.e. the FETs 32 and 32'. While sufficient base drive current is important, excessive circulating current will cause heating and power waste. Accordingly, it is desirable to control the on time of the field effect transistors 32 and 32' in order to obtain optimum operation for a given application of the switching amplifier.

Figure 3:
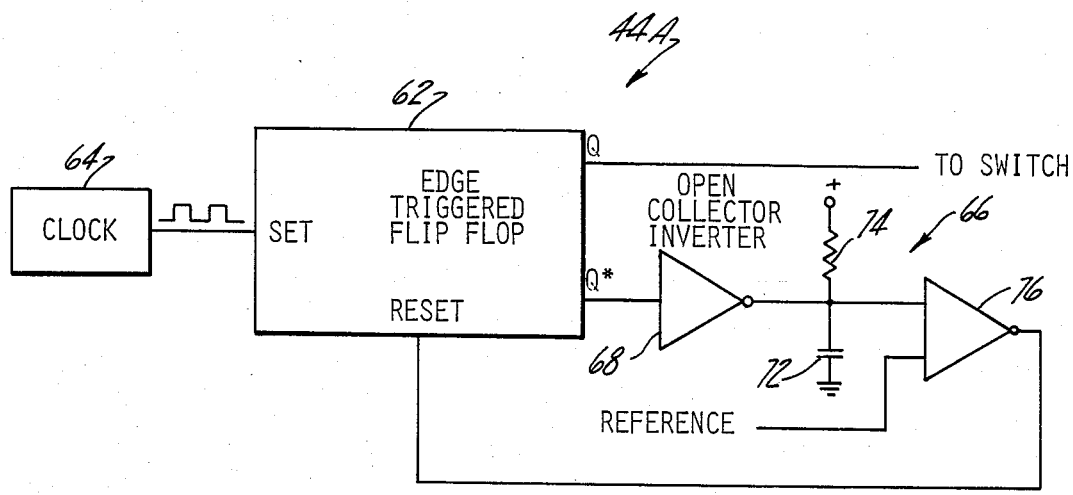
FIG. 3 is a schematic diagram of a regulating transistor control circuit for use with the switching amplifier of this invention.

A regulating switching control circuit 44A is shown in FIG. 3. This circuit controls the on time of the FETs 32 and 32' such that the base drive current is substantially independent of fluctuation of the supply voltage from the voltage source 14. Additionally, the base drive current is provided by this circuit may be preset or variable in accordance with the load operating conditions or other factors by means of a reference voltage.

The circuit of FIG. 3 comprises a flip-flop 62 which operates under the control of a clock 64 and a reset circuit 66 to produce a regulating signal for controlling the FETs 32 and 32'. The regulating signal is a pulse train in which the on time of individual pulses is determined by the reset circuit 66 in accordance with supply voltage variations and a reference voltage.

The clock 64 produces a train of periodic voltage pulses which are applied to the set input of the flip-flop 62. The flip-flop 62 is an edge triggered flip-flop having a Q output which goes to logic high in response to the rising voltage of the leading edge of the clock signal. The Q output of the flip-flop 62 is connected with the input or gate of the FETs 32 and 32'. A logic high voltage on the Q output of the flip-flop 62 turns on the FETs 32 and 32'. The $\overline{Q}$ output of the flip-flop 62 goes to logic low in response to the rising voltage of the leading edge of the clock signal. The $\overline{Q}$ output is coupled through an open collector inverter 68 to capacitor 72 which is also connected to ground. A pull-up resistor 74 is connected between the output of the inverter 68 and the positive terminal of the voltage source 14. The junction of the resistor 74 and capacitor 72 is connected with the inverting input of a comparator 76. The non-inverting input of the comparator 76 is connected with a reference voltage source. The output of the comparator 76 is applied to the reset input of the flip-flop 62.

The operation of the regulating switch control circuit 44A of FIG. 3 is as follows. When the rising voltage of the leading edge of the clock signal is applied to the set input of the flip-flop 62, the Q output of the flip-flop 62 goes to logic high and causes the base current supply switches, namely FETs 32 and 32' to be turned on. At the same time, the $\overline{Q}$ output of the flip-flop 62 goes to logic low and the output stage of the open collector inverter 68 becomes non-conductive. As a result, current through the pull-up resistor 74 charges the capacitor 72 at a rate approximately proportional to the voltage of supply voltage source 14. The voltage across the capacitor 72 is applied to the inverting input of the comparator 76. When this voltage reaches the reference voltage at the non-inverting input of the camparator 76 the output of the comparator goes to logic low. This output is applied to the reset input of the flip-flop 62 and switches it to its reset state. When the flip-flop is switched to the reset state, output Q goes to logic low and the base current supply switches FET 32 and 32' are turned off. The $\overline{Q}$ output goes to logic high and causes the output of the inverter 68 to go to logic low whereby the current through resistor 74 is bypassed to ground and the capacitor 72 is discharged to prepare it for the next cycle. The next cycle is initiated with the rising voltage of the leading edge of the next clock pulse. Thus, the duration of any of the pulses at the Q output of the flip-flop 62 is inversely proportional to the voltage from the supply voltage source 14 as required to make the base drive current independent of the supply voltage and is approximately proportional to the reference voltage input to the comparator 76 thereby making the base drive current vary directly with the reference voltage. It will now be appreciated that the reference voltage input to the comparator 76 may be preset at a constant value in accordance with a predetermined load characteristic for the switching amplifier; alternatively, the reference voltage may be varied in accordance with variations in the energization of the load by the switching amplifier.

Figure 4:
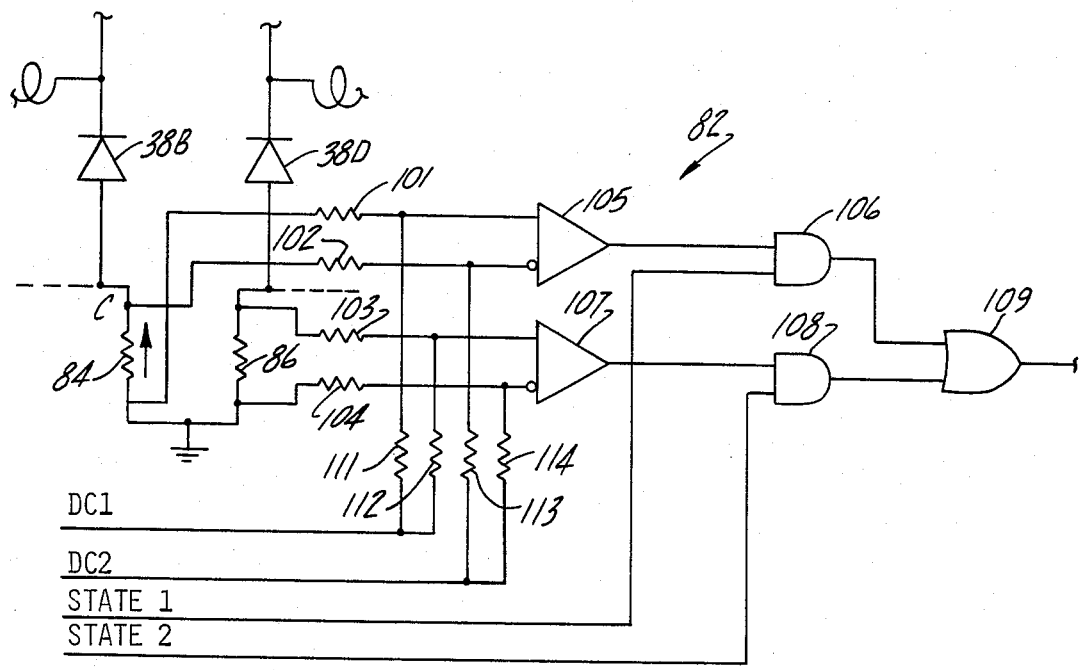
FIG. 4 is a comparator circuit for sensing the output current of the switching amplifier of this invention.

In certain applications of the switching amplifier 10 of FIG. 1 or 2, it may be desirable for control purposes to sense the output current of the switching amplifier. FIG. 4 shows the switching amplifier of this invention with a current sensing circuit. (For simplicity, FIG. 4 shows only enough of the switching amplifier to show how the sensing circuit 82 and the amplifier are interconnected. Otherwise the switching amplifier is identical to the circuit of FIG. 1.)

The current sensing circuit 82 comprises a current sensing resistor 84 of low ohmic value connected in series between the emitter of the high current transistor 27B and ground. Another current sensing resistor 86 of low ohmic value is connected between the emitter of the high current transistor 27D and ground. When high current transistor 27B is in its conducting state, the voltage across the sensing resistor 84 is indicative of the load current. This indication is most accurate when the FET 32 is turned off. Similarly, when high current transistor 27D is in its conductive state, the voltage across the sensing resistor 86 is indicative of load current and this indication is most accurate when the FET 32' is turned off.

In the circuit of FIG. 4 signal lines DC1 and DC2 provide a differential control voltage specifying a current level. There are two independent circuits each to determine if the current through one of the load current sensing resistors 84 or 86 is more or less than the current specified by the differential control voltage. An OR circuit combines the outputs of these two current sensing circuits to develop a single output signal indicating if the load current is or is not greater than the current level specified by the differential control voltage. This signal may be used as input to the amplifier switching control circuit 36 or 36' to enable it to maintain the load current at the specified current level or it may be used for other purposes such as triggering an over-current shutdown.

Consider first the circuit comprising current sensing resistor 84, resistors 101, 102, 111 and 113 and comparator 105. The current through current sensing resistor 84 is indicated by the differential voltage across its terminals. This differential voltage and the differential control voltage are applied to the two voltage dividers formed of resistors 101 and 111 and resistors 102 and 113. The ratio of the resistance of resistor 101 to the resistance of resistor 111 is equal to the ratio of the resistance of resistor 102 to the resistance of resistor 113 and is the ratio of the voltage drop across current sensing resistor 84 to the differential control voltage when the current in the current sensing resistor 84 is equal to the current being specified by the differential control voltage. Therefore, when the current through current sensing resistor 84 is greater than the current being specified by the differential control voltage the voltage at the non-inverting input of comparator 105 is greater than the voltage at the inverting input and the output is high or logical true indicating that the current exceeds the current being specified by the differential control voltage. Similarly, if the current through current sensing resistor 84 is less than the current specified by the differential control voltage then the voltage at the non-inverting input of comparator 105 is less than the voltage at the inverting input and the output of comparator 105 is low or logical false.

Similarly, the circuit comprising current sensing resistor 86, resistors 103, 104, 112 and 114 and comparator 107 causes a signal to be developed at the output of comparator 107 that is high or logical true if the current sensed by current sensing resistor 86 is greater than the current specified by the differential control voltage and is otherwise logical false or low.

Two state signals are provided, preferably by the amplifier switching control circuit 31 or 31'.

The first state signal is high or logical true if the current in sensing resistor 84 is equal to the load current to the required precision. This would be true if high current transistor 42B is on and FET switch 32 is not conducting. For purposes of over-current sensing the additional precision attained by requiring the FET switch 32 to be off may not be required.

Similarly, the second state signal is high or logical true if the current in sensing resistor 86 is equal to the load current to the required precision.

The output of comparator 105 is combined with the first state signal by AND circuit 106 to provide a signal that is high or true at times when the current sensing resistor 84 is conducting the load current and that current is greater than the current specified by the differential control voltage.

Similarly, the output of comparator 107 is combined with the second state signal by AND circuit 108 to provide a signal that is high or logical true at times when the current sensing resistor 86 is conducting the load current and that current is greater than the current specified by the differential control voltage.

The output signals of logical AND circuits 106 and 108 are combined by OR circuit 109 to produce a signal that is high or true if the current through one of the current sensing resistors 84 or 86 is greater than the current specified by the differential control voltage and when the current in that resistor is a valid indication of the load current is low or false at other times.

In the following the method by which the output signal of the circuit of FIG. 4 can be used to control the amplifier output stage to obtain the specified output current is described. The output signal is an accurate indicator of whether or not the load current is or is not greater than the current specified by the differential control voltage when the regulating switches 32 and 32' are not conducting. At these times the base drive currents for the high current transistors are generated locally by the inductors and they do not add to the current sensed by the current sensing resistors 84 and 86. Therefore, the only current other than load current sensed by current sensing resistors 84 and 86 is the control current from the amplifier switching control circuit 36 which is always much smaller than the base drive current and can be made arbitrarily small by using additional stages of amplification as previously described or by using FET transistors, as shown in FIG. 1A, for base current bypass switches 34A, 34C, 35B and 35D.

When the regulating switches 32 and 32' are conducting the base drive current also passes through the current sensing resistors 84 and 86 and the output signal therefore is not dependent so completely upon the load current.

One known method of controlling switching amplifiers is as follows. A clock signal of constant duty cycle initiates each amplifier cycle. At the initiation of each cycle the amplifier switching control circuit sets the output stage into one of the following three states:

State 1 wherein high current transistors 26A and 27D are turned on. The purpose of this state is to increase load current.

State 2 wherein high current transistors 27B and 26C are turned on. The purpose of this state is to decrease load current or, in other words, to increase load current in the negative direction.

State 3 wherein high current transistors 27B and 27D are turned on. The purpose of this state is to not influence load current.

The state is selected at this initiation of the cycle according to the following rules:

| Current related to desired current | State at end of previous cycle | State set at beginning of current cycle |
|---|---|---|
| Current less than desired current | 1 | 1 |
|  | 2 | 3 |
|  | 3 | 1 |
| Current greater than desired current | 1 | 3 |
|  | 2 | 2 |
|  | 3 | 2 |

If the amplifier is set to state 1 at the beginning of a cycle because the load current is less than the specified load current then the differential current control voltage is increased slightly and (after waiting for the circuits to settle) the load current is monitored. If the load current is found to be exceeding the current specified by the increased differential control voltage then the switching control circuit resets the amplifier to be in state 3 for the remainder of the cycle.

If the amplifier is set to state 2 at the beginning of a cycle because the load current is greater than the specified load current then the differential current control voltage is decreased slightly and (after waiting for the circuits to settle) the load current is monitored. If the load current is found to be less than the current specified by the diminished differential control voltage then the switching control circuit resets the amplifier to be in state 3 for the remainder of the cycle.

If the amplifier is set to state 3 at the beginning of a cycle or at any other time then it is allowed to remain in state 3 for the remainder of the cycle.

It is now apparent that the output signal of the circuit of FIG. 4 is appropriate for use to control the amplifier to provide the specified load current if the beginning of the period of conduction of regulating switches 32 and 32' coincides with the beginning of the aforementioned amplifier cycle. Then the circuits can settle while the regulating switches 32 and 32' are conducting and the regulating switches 32 and 32' can be turned off for maximum accuracy of the current sensing circuits of FIG. 4 for the remainder of the amplifier cycle while the load current is being monitored.

Although the description of this invention has been given with reference to a particular embodiment, it is not to be construed in a limiting sense. Many variations and modifications will now occur to those skilled in the art. For a definition of the invention reference is made to the appended claims.

What is claimed is:

1. A switching amplifier comprising:
   first, second, third and fourth high current transistors each having its emitter-to-collector circuit connected in a respective arm of a bridge circuit which has diagonally opposite supply voltage terminals and diagonally opposite output terminals,
   first, second, third and fourth base current shunting means connected in shunt with the respective base-to-emitter circuits of the first, second, third and fourth high current transistors,
   first and second inductors coupled respectively with the bases of the first and second high current transistors and in series with a first base current regulating switch,
   third and fourth inductors coupled respectively with the bases of the third and fourth high current transistors and in series with a second base current regulating switch,
   and first, second, third and fourth unidirectional conducting means connected respectively in series with the first, second, third and fourth inductor and the base-to-emitter circuit of the first, second, third and fourth high current transistor.

2. The invention as defined in claim 1 wherein, each of said first, second, third and fourth base current shunting means is a transistor.

3. The invention as defined in claim 1 wherein, each of said first, second, third and fourth base current shunting means is a field effect transistor.

4. The invention as defined in claim 1 wherein, each of said unidirectional conducting means is a diode.

5. The invention as defined in claim 1 wherein, each of said base current regulating switches is a switching transistor.

6. The invention as defined in claim 1 wherein, each of said first and second base current regulating switches is a field effect transistor.

7. The invention as defined in claim 2 including:
   fifth, sixth, seventh and eighth base current shunting means connected in shunt with the respective base-to-emitter circuits of the first, second, third and fourth base current shunting transistors,
   fifth, sixth, seventh and eighth inductors connected to the bases, respectively, of the first, second, third and fourth base current shunting transistors and connected, respectively, in series with the first, second, third and fourth unidirectional conducting means and the base-to-emitter circuits of the first, second, third and fourth base current shunting transistors.

8. The invention as defined in claim 7 wherein, each of said fifth, sixth, seventh and eighth base current shunting means is a transistor.

9. The invention as defined in claim 1 including, regulating switch control means coupled with the first and second base current regulating switches for regulating the base drive current so that it is independent of supply voltage fluctuations.

10. The invention as defined in claim 1 including, a regulating switch control means coupled with said first and second base current regulating switches for regulating the base drive current so that it is approximately proportional to a predetermined reference signal.

11. The invention as defined in claim 9 or 10 wherein, said regulating switch control means includes a clock pulse generator, pulse width modulating means for producing a control signal, said pulse width modulating means including means responsive to the supply voltage and to a reference voltage for determining the width of each pulse.

12. The invention as defined in claim 1 including an output current sensing circuit comprising:
a first current sensing resistor in series between said second high current transistor and ground,
a second current sensing resistor series between said fourth high current transistor and ground,
and circuit means coupled with said first and second transistors for producing a signal indicative of whether the current through the resistors is greater or less than a predetermined value.

13. The invention as defined in claim 12 wherein said circuit means includes:
a first voltage divider connected between one terminal of said first current sensing resistor and a first control voltage source,
a second voltage divider connected between the other terminal of said first current sensing resistor and a second control voltage source,
a third voltage divider connected between one terminal of said second current sensing resistor and said first control voltage source,
a fourth voltage divider connected between the other terminal of said second current sensing resistor and said second control voltage source,
and means coupled with the voltage dividers for producing said signal.

* * * * *